(12) United States Patent  
Dirks et al.

(10) Patent No.: US 6,203,086 B1
(45) Date of Patent: Mar. 20, 2001

(54) TOOL BOX AND TOP COVER FOR TRUCK BOX

(75) Inventors: Jay D. Dirks; Les H. Dirks, both of Athol, ID (US)

(73) Assignee: Coeur d'Alene Patent Investment LLC, Coeur d'Alene, ID (US)

( * ) Notice: Subject to any disclaimer, the term of this patent is extended or adjusted under 35 U.S.C. 154(b) by 0 days.

(21) Appl. No.: 08/964,160

(22) Filed: Nov. 4, 1997

(51) Int. Cl.[7] .................................................. B60R 9/055
(52) U.S. Cl. .................................. 296/37.6; 276/100.07; 224/404
(58) Field of Search ............................. 296/37.6, 100.01, 296/100.02, 100.06, 100.07; 224/281, 402, 403, 404

(56) References Cited

U.S. PATENT DOCUMENTS

| | | | | |
|---|---|---|---|---|
| 3,765,717 | * | 10/1973 | Garvet ........................... | 296/100.07 |
| 4,469,364 | * | 9/1984 | Rafi-Zadeh ..................... | 296/37.6 |
| 4,522,326 | * | 6/1985 | Tuohy, III ...................... | 296/37.6 X |
| 4,635,992 | * | 1/1987 | Hamilton et al. ............... | 296/37.6 |
| 4,844,305 | * | 7/1989 | McKneely ...................... | 296/37.6 X |
| 5,088,636 | * | 2/1992 | Barjas ............................ | 296/37.6 X |
| 5,121,959 | * | 6/1992 | King ............................... | 296/37.6 |
| 5,765,902 | * | 6/1998 | Love .............................. | 296/100.01 |

* cited by examiner

Primary Examiner—D. Glenn Dayoan
Assistant Examiner—Jason Morrow
(74) Attorney, Agent, or Firm—Zarley, McKee, Thomte, Voorhees & Sease

(57) ABSTRACT

A tool box is movably mounted within a vehicle carrying compartment for movement between a forward position and a rear position within the compartment. A top cover may be mounted in covering relation over the top of the carrying compartment and includes access doors for providing communication into the carrying compartment and to the tool box therein.

14 Claims, 7 Drawing Sheets

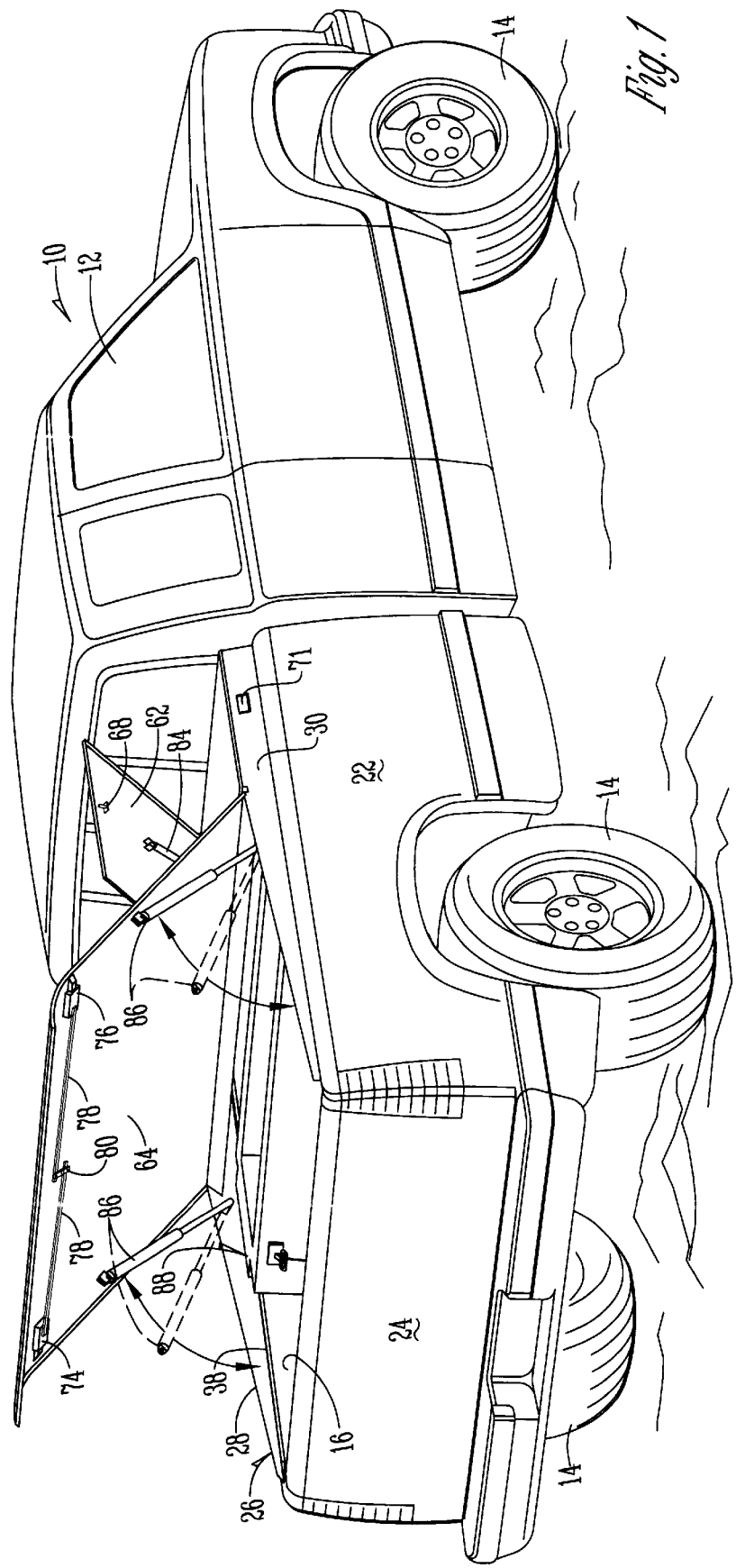

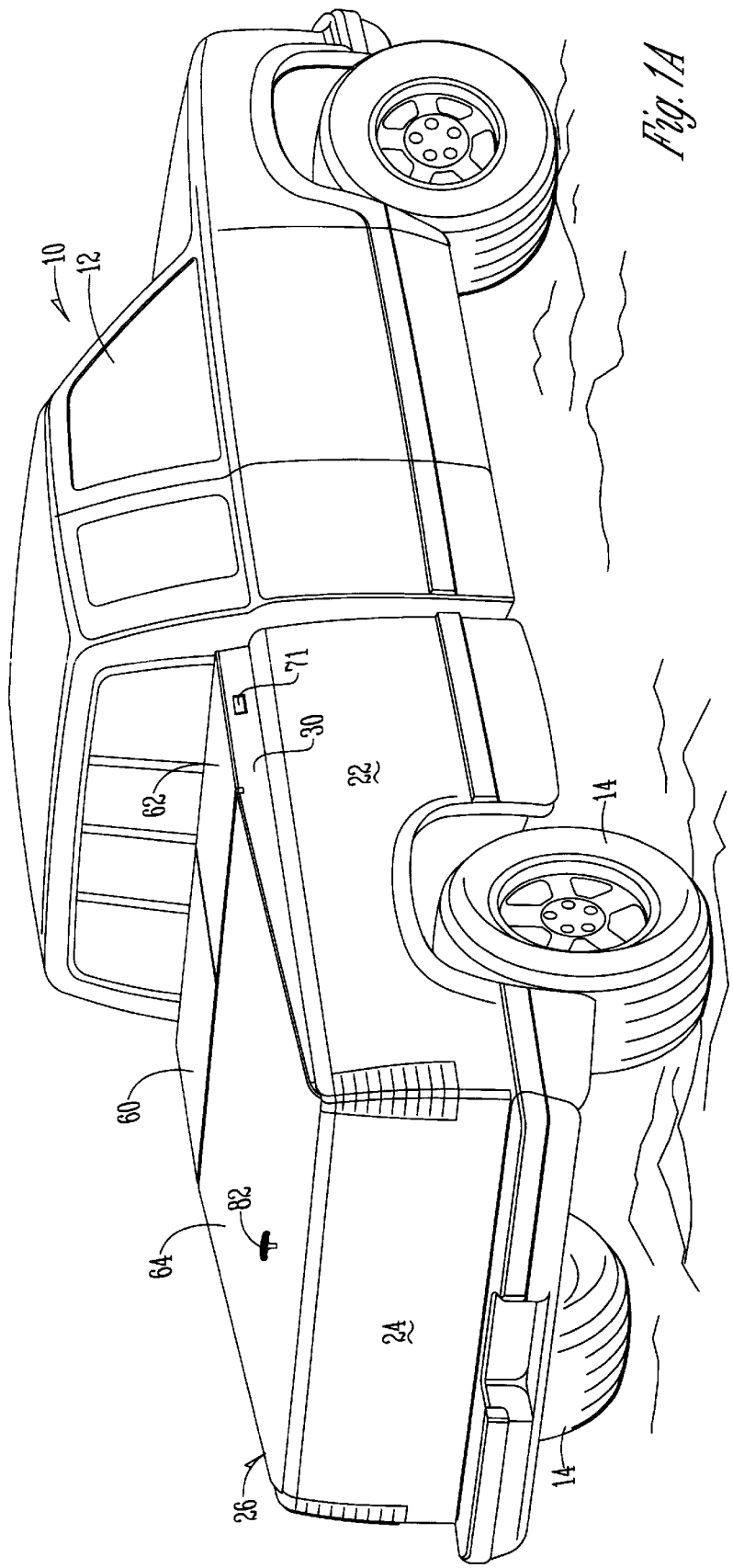

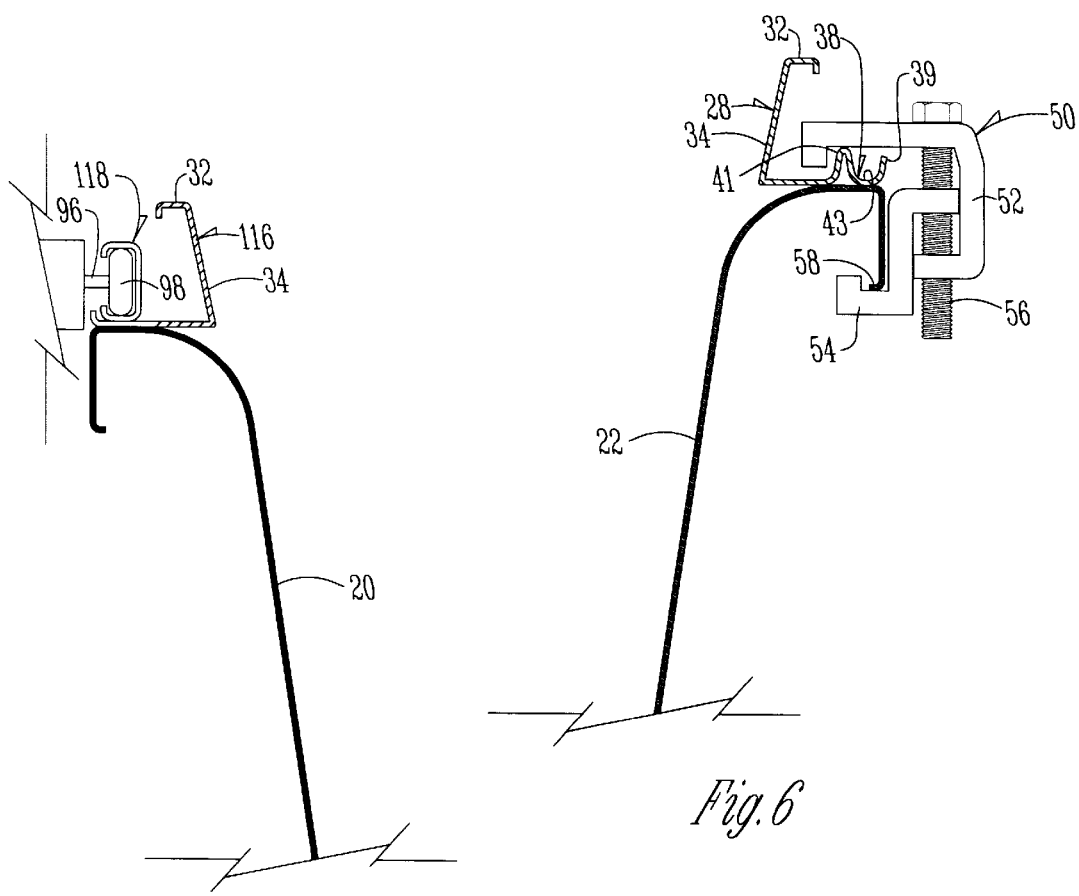
Fig. 8
Fig. 6
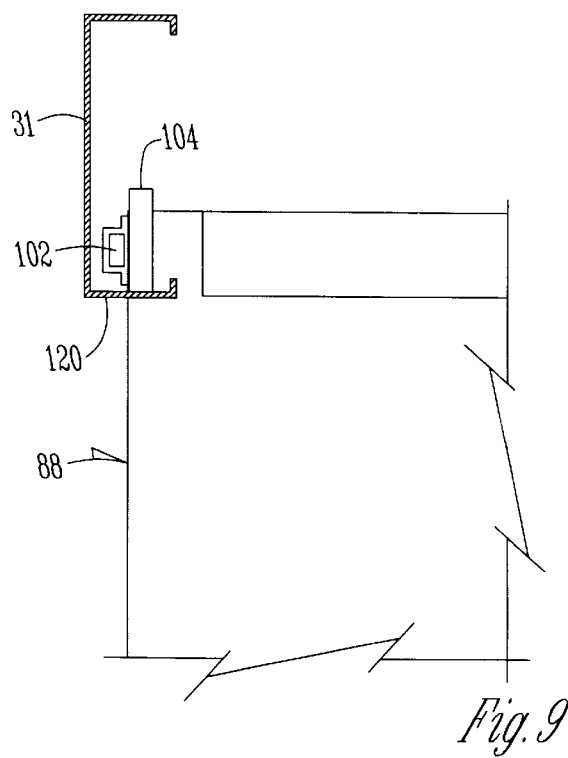
Fig. 9

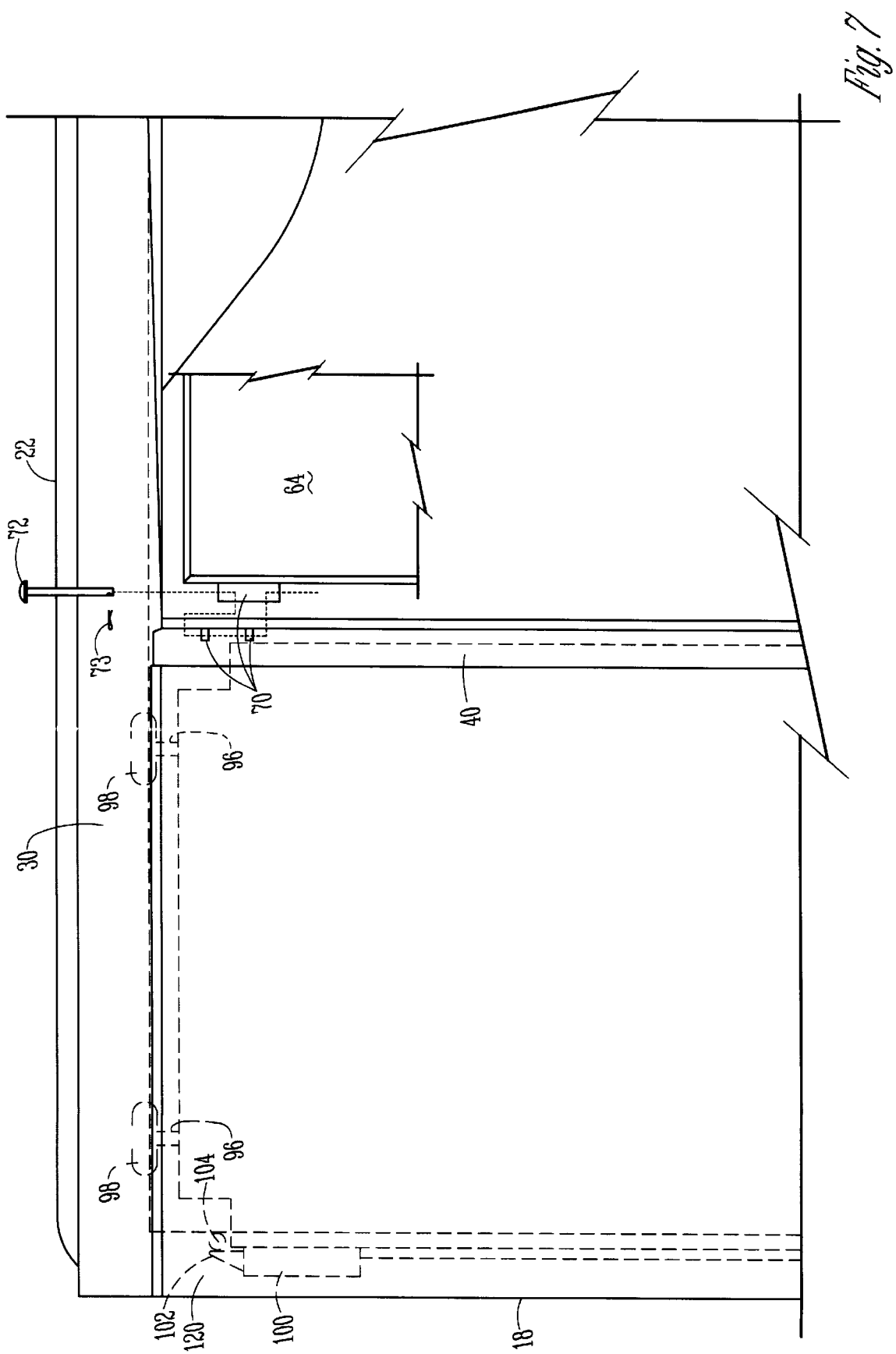

TOOL BOX AND TOP COVER FOR TRUCK BOX

BACKGROUND OF THE INVENTION

The present invention relates to a tool box and top cover for truck box.

Tool boxes have been provided for use in the carrying compartments or boxes of pickup trucks. Usually these tool boxes are attached to the front end of the pickup truck box immediately behind the truck cab.

Access to these tool boxes is limited to access from the sides of the vehicle, and on occasion this can require the user of the tool box to walk around to the other side of the vehicle in order to reach and gain access to certain parts of the tool box.

Security is also sometimes a problem with prior art tool boxes in that they are exposed at the rear of the truck. Some tool boxes have lids which can be locked, but potential thieves can easily gain access to the box, drill holes in it, or otherwise break into the box.

Top covers have been provided for pickup trucks, but such top covers are difficult to use in combination with a tool box mounted inside the truck bed. Access to the tool box once a top cover has been placed over the truck bed is often difficult.

Therefore, a primary object of the present invention is the provision of an improved tool box and top cover for a truck box.

A further object of the present invention is the provision of an improved tool box which can be detachably mounted at the front of the truck box and which can be easily moved to the rear of the truck box for access by a user of the tools within the tool box.

A further object of the present invention is the provision of an improved tool box and top cover for truck box which can be locked to prevent intruders or thieves from having access to any portion of the interior of the truck box, while at the same time providing easy access for the owner or user of the vehicle.

A further object of the present invention is the provision of an improved tool box and top cover which is attractive in appearance, economical to manufacturer, and durable in use.

SUMMARY OF THE INVENTION

The present invention includes a combination of a vehicle and a tool box which is movable within the vehicle carrying compartment. The compartment of the vehicle includes a floor, a front wall, a rear wall, and opposite side walls extending up from the edges of the floor. An elongated first side rail is attached to one of the side walls of the carrying compartment and a second side rail is attached to the other of the side walls of the carrying compartment in substantial parallel relation to the first side rail.

The tool box includes a first roller at one of its ends and a second roller at the opposite of its ends. The first and second rollers are movably mounted to the first and second side rails respectively to permit the tool box to move from a forward position located near the front wall of the compartment to a rear position located rearwardly from that forward position.

The foregoing combination may be utilized without a top wall. However, a top wall may be used in combination with the foregoing tool box. The top wall covers the open upper end of the truck box and encloses the tool box therein. The top cover includes at least one access opening adjacent the front of the carrying compartment and includes a second or rear access opening adjacent the rear of the carrying compartment. Hinged doors are provided over the front access opening and the rear access opening, and these doors are capable of being latched and locked to make the interior of the carrying compartment secure.

In one embodiment of the invention there is a third access opening located at the front end of the access compartment so that both the first and the third access openings provide access to the tool box when the tool box is positioned adjacent the forward end of the carrying compartment.

BRIEF DESCRIPTION OF THE FIGURES OF THE DRAWINGS

FIG. 1 is a pictorial view of a vehicle having the tool box and top cover of the present invention thereon.

FIG. 1A is a pictorial view similar to FIG. 1, but showing the top cover doors in a closed position.

FIG. 6 is a sectional view taken along line 6—6 of FIG. 3.

FIG. 7 is a partial top plan view showing the manner in which the rear access door can be removed from the top cover FIG. 8 is a sectional view similar to FIG. 4, but showing a modified form of track used for guiding the movement of the tool box.

FIG. 9 is a sectional view taken along line 9—9 of FIG. 4.

DETAILED DESCRIPTION OF THE PREFERRED EMBODIMENT

Figure 2:
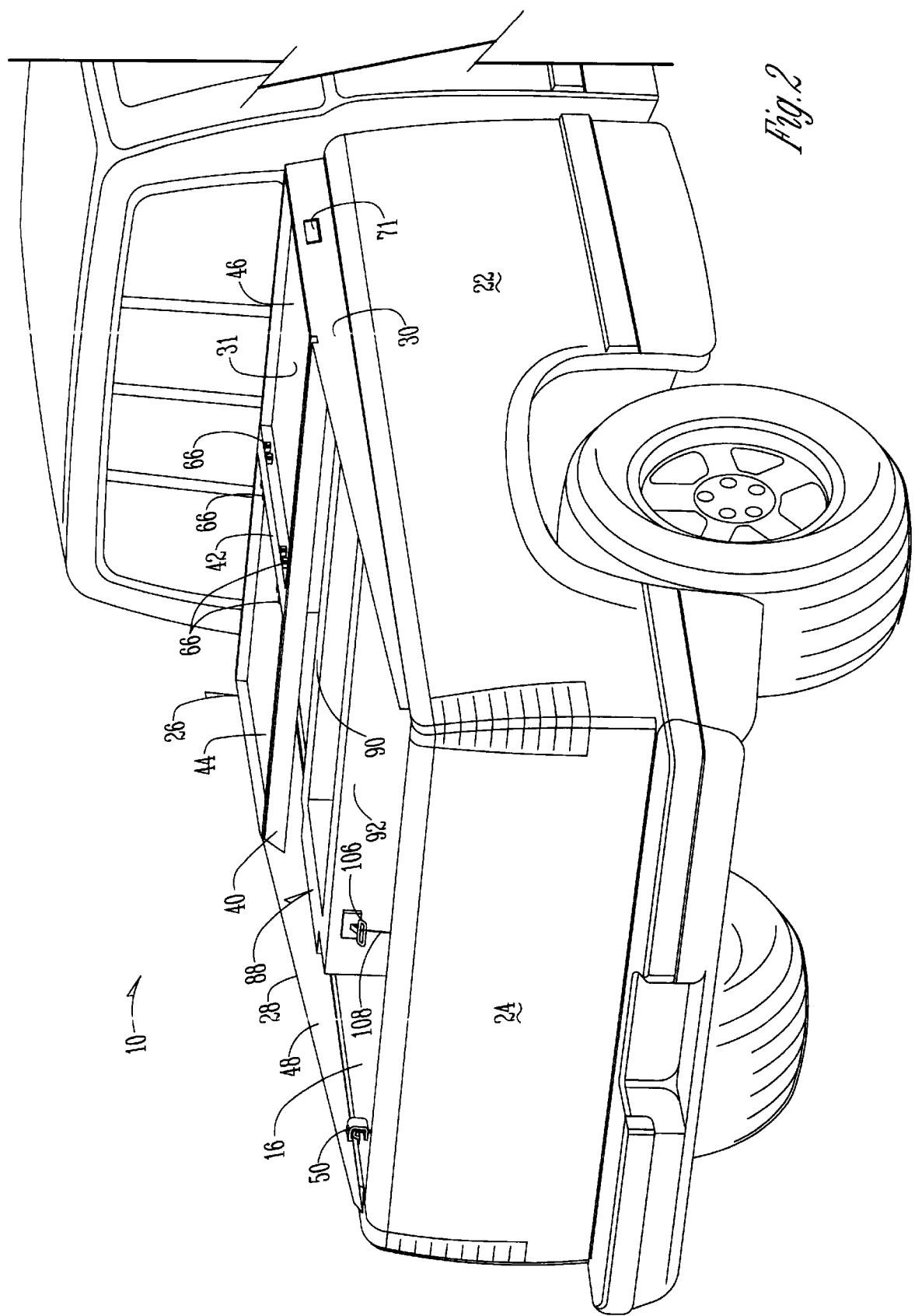
FIG. 2 is a pictorial view similar to FIG. 1, but showing the doors of the top cover removed.

Referring to FIG. 1 the numeral 10 generally designates a truck having a cab 12 and ground engaging wheels 14. On the rear of the truck 10 is a truck box or carrying compartment 16 having a floor 17 (FIG. 3), a front wall 18, opposite side walls 20–22 and a rear wall or tailgate 24.

Mounted over the top of the carrying compartment 16 is a top cover 26. Top cover 26 includes two side frame members 28 and 30, and a front frame member 31. As view in cross section (FIG. 4) the two side frame members 28 and 30 each include an upper horizontal flange 32, a frame side 34, a bottom flange 36, and a U-track 38 which is formed by an inner leg 39, an outer leg 41, and a U-bottom 43. U-track 38 extends the entire length of side frame members 28 and 30.

Extending between the two side frame members 28–30 is a cross frame member 40, and also extending between the two side frame members 28–30 is the front frame member 31. A longitudinal frame member 42 extends forwardly from cross frame member 40 to front frame member 31 so as to provide two access openings 44, 46 adjacent the front of the top cover 26. A rear access opening 48 is provided rearwardly of the cross member 40.

The top cover 26 is detachably mounted to the side wall 20, 22 by means of clamps 50 which are positioned at the four corners of the top cover 26. The structure of clamps 50 is shown in FIG. 6 and includes a first jaw member 52 and a second jaw member 54 each of which are threaded over a threaded bolt 56 and each of which embrace a top flange 58 of the truck side wall 20 and the U-track 38 of the side frame member 28. This holds the side frame member 28 to the top edge of the truck side wall 20. The location of the clamps 50 at the four corners of the top cover 26 leaves the elongated U-tracks 38 free between the opposite ends of each of the side frame members 28 and 30.

Mounted in covering relationship over the front access openings 44 and 46, and the rear access opening 48 are a pair of front top doors 60, 62 and a rear top door 64 respectively. Doors 60, 62 are connected to the longitudinal frame member 42 by hinges 66 (FIG. 2). On each of the front doors 60, 62 is a catch member 68 located on the door edge opposite from hinges 66. Catch member 68 is adapted to be retentively engaged by a conventional latch member (not shown) which can be pivoted out of retentive engagement with catch 68 by means of a lever handle 71. Handle 71 may be of the type that can be locked to prevent unwanted access to the compartment chamber 16 as desired.

Rear top door 64 is hinged at its forward edge to the cross frame member 40 by means of hinges 70 (FIG. 7). Hinges 70 include a hinge pin 72 which is held in place by a pin 73, and which can be removed to permit removal of the rear door 64.

Removal of the rear door 64 may be desirable in order to permit objects which have a height higher than the top cover 26 to be placed within the carrying compartment. Also, removal of the rear door 64 may be desirable if a goose neck trailer is mounted to the floor 17 of the truck bed by means of a fifth wheel connection. In that situation the rear top door would be removed so as to permit access of the goose neck from the trailer to be inserted into the rear of the carrying compartment.

The rear top door 64 includes on its under surface a pair of bayonet latches 74, 76 which are adapted to engage pins (not shown) on the inside edges of side frame members 28 and 30 to detachably hold the rear top door 64 in a closed position. A pair of connecting straps 78 extend from the bayonet latches 74, 76 to a central pivot link 80 which is connected to a latch handle 82 on the upper surface of the door 64. By rotating the latch handle 82 it is possible to withdraw the bayonet latches 74, 76 so as to permit raising and opening of the rear door 64. A suitable lock (not shown) may be provided for locking latch handle 82 to prevent opening of the door 64 and thus provide security.

The two front doors 60 and 62 include shock absorbers 84 which hold the doors in their open position as shown in FIG. 1. Similarly the rear door 64 includes a pair of shock absorbers 86 for the same purpose. The shock absorbers 86 may be easily detached from the door 64 by any conventional quick disconnect mechanism so that the door can be removed for the purposes described previously.

A tool box 88 is provided within the carrying compartment 16 and includes a front wall 90, a rear wall 92, opposite ends walls 94, 95. Tool box 88 can include any number of desired partitions, boxes, or inner compartments for storing tools, and the details of these partitions are not shown in the drawings.

Figure 3:
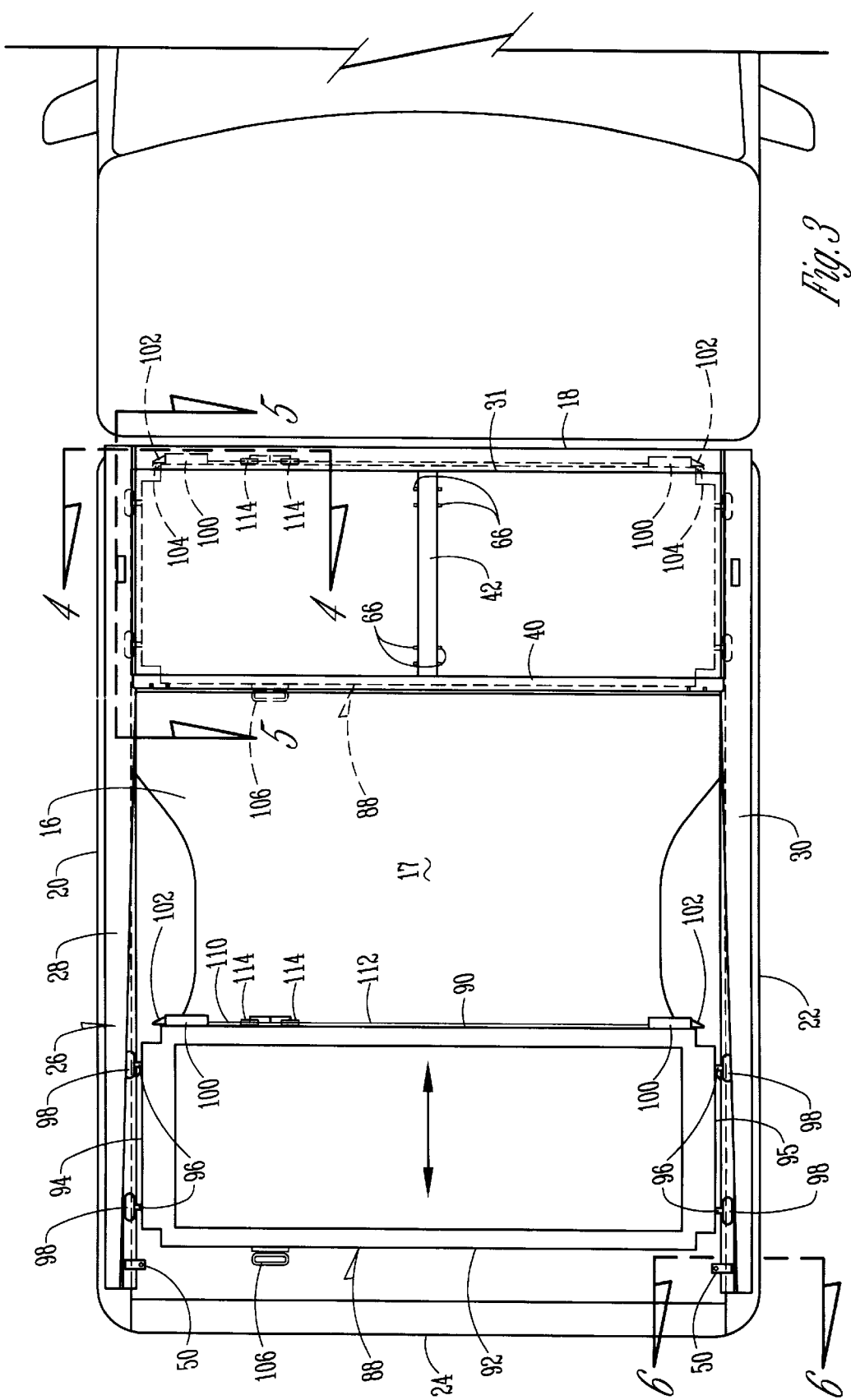
FIG. 3 is a top plan view of FIG. 2 showing the tool box in its rear position, and showing the tool box in phantom lines in its forward position.
Figure 4:
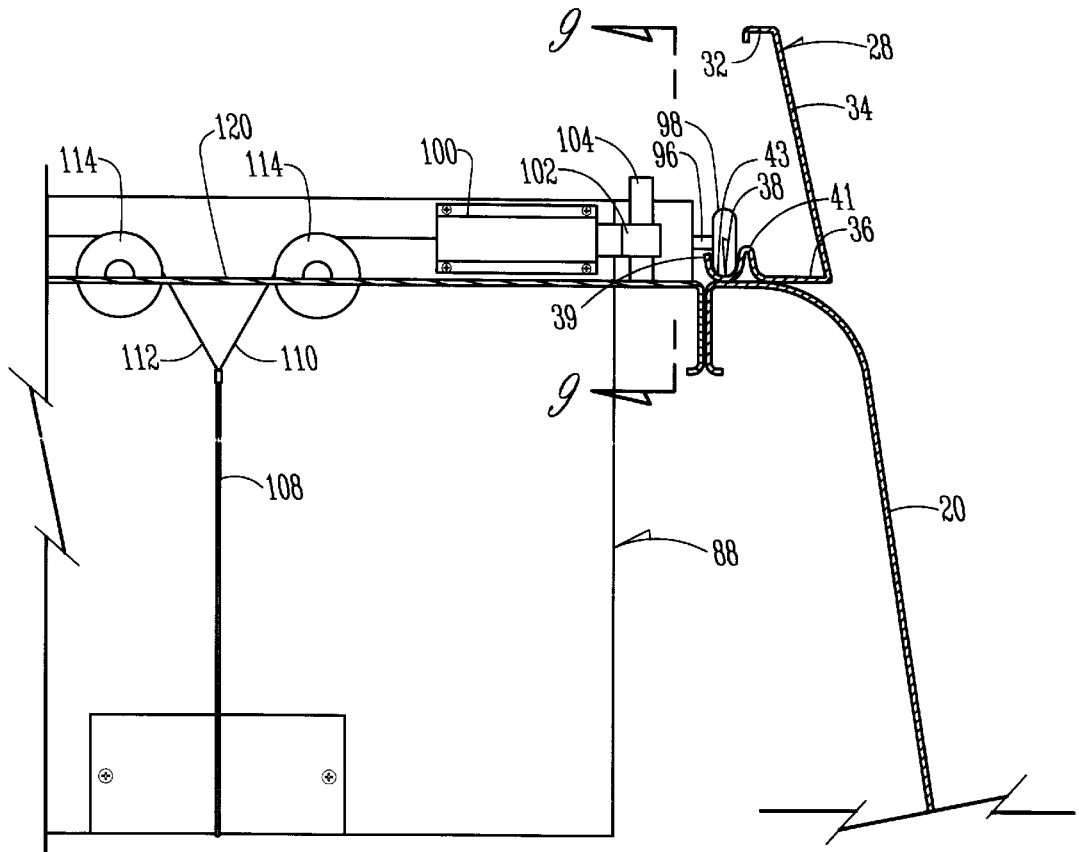
FIG. 4 is a sectional view taken along line 4—4 of FIG. 3.

Extending outwardly from the end walls 94, 95 are four axles 96 which include wheel bearings 98 on their outer ends. Wheel bearings 98 are fitted within the U-shaped track 38 as shown in FIG. 4. The rolling engagement of wheel bearings 98 in these U-shaped tracks 38 permits the tool box 88 to roll easily from its forward most position shown in phantom lines in FIG. 3 to its rear position shown in solid lines in FIG. 3.

Mounted on the front wall 90 of the tool box 88 are a pair of bayonet latches 100 each of which includes an extensible latch pin biased outwardly in conventional fashion. Referring to FIGS. 3, 4, and 9, latch pins 102 are adapted to retentively engage a pair of stop pins 104 attached to a bottom flange 120 of front frame member 31.

Figure 5:
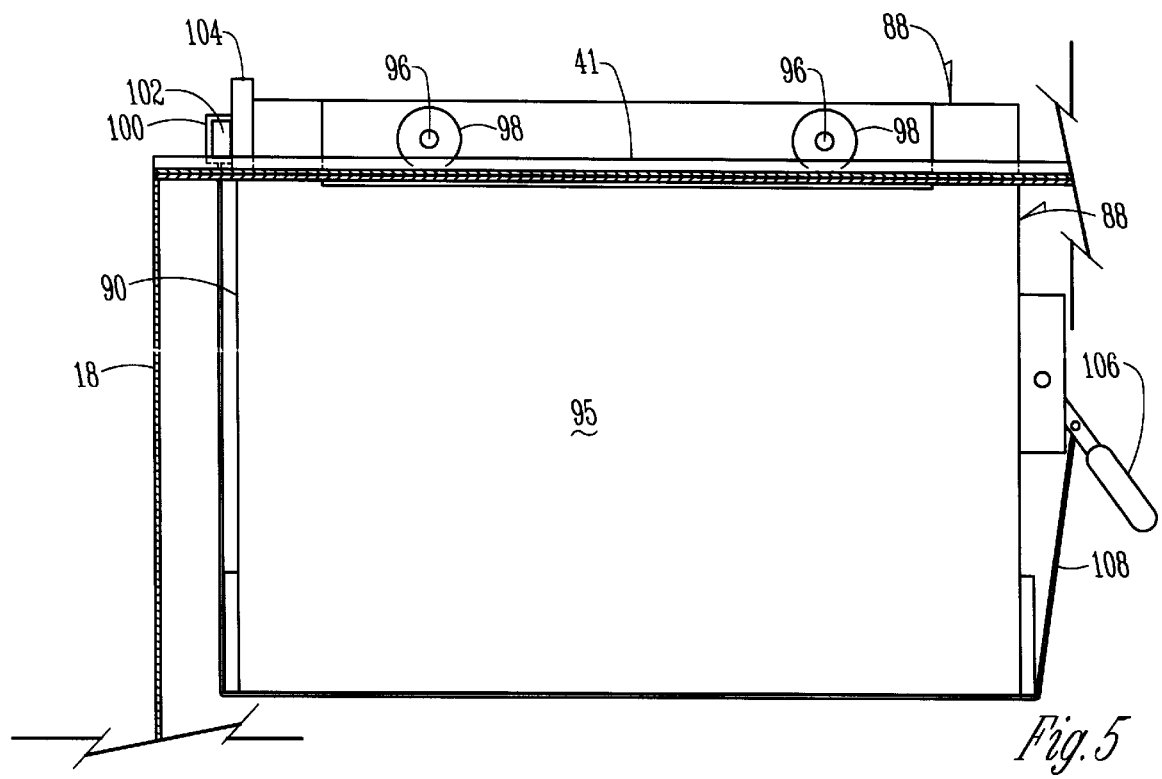
FIG. 5 is a sectional view taken along line 5—5 of FIG. 3.

On the rear wall 92 of the tool box 88 is a latch handle 106 (FIG. 5) which is pivotally mounted and which includes a latch cable 108 connected thereto. Latch cable 108 passes downwardly below the bottom of the tool box 88 and then upwardly along the outside surface of the front wall 90. As can be seen in FIG. 4 at its upper end the cable 108 splits into two split cables 110, 112 which pass around pulleys 114 and which are connected to the latch pins 102 of the two spaced apart bayonet latches 100. Thus by pulling on latch handle 106 it is possible to retract the bayonet slot pins 102 and release the tool box from its connection to the stop pins 104.

During transporting of the vehicle, and in normal situations the tool box is attached by means of the bayonet latches 100 and stop pins 104 to the front wall of the truck bed. This holds the tool box in position during transporting and prevents it from rolling along the tracks 38 during transporting.

However, when the vehicle is stopped, and when the operator wishes to gain access to tool box 88, the operator can grasp the latch handle 106, pull it upwardly and thereby release the bayonet latches 100. This releases the tool box 88 and permits it to roll freely to its rear position adjacent the tailgate 24 of the vehicle carrying compartment. This permits the operator to gain access to the entire tool box from the tailgate 24 of the vehicle rather then having to move from one side of the vehicle to the other as is the case with conventional tool boxes.

Referring to FIG. 8, a modified form of channel or track is shown and is designated by the numeral 116. Side frame 116 in cross section, is identical to the side frame member 28 shown in FIG. 6 with the exception that a C-shaped channel 118 is formed in the place of the U-shaped channel 38 shown in FIG. 6. All other identical parts are shown with the same numerals to indicate corresponding parts between the side frame member 28 and the alternate form of side frame members 116.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. In combination:
   a vehicle having a carrying compartment therein, said carrying compartment comprising a floor having a front floor edge, a rear floor edge, and two opposite side floor edges, said carrying compartment further comprising a pair of opposite side walls, a front wall, and a rear wall, wherein said side, front and rear walls extend upwardly from said opposite side floor edges, said front floor edge, and said rear floor edge, respectively, said pair of opposite side walls each having an upper side wall edge, said front and rear walls having an upper front wall edge and an upper rear wall edge, respectively;

a top cover comprising at least one access door and first and second spaced apart side frame members attached to said upper side wall edges of each of said pair of side walls;

said at least one access door being attached to, and extending between, said first and second side frame members, said access door being movable from a closed position in covering relation over said carrying compartment to an open position permitting access to said carrying compartment through a first access opening;

said first and second side frame members of said top cover having first and second elongated channels respectively, each extending along and above one of said upper side wall edges of said carrying compartment;

a tool box having first and second opposite ends;

a first roller and a second roller rotatably mounted to said first and second ends respectively of said tool box and engaging said first and second channels respectively for rolling movement along the lengths thereof so as to permit movement of said tool box back and forth from a forward position located approximately adjacent said front wall of said compartment to a rear position located rearwardly from said forward position.

2. A combination according to claim 1 and further comprising first securing brackets for detachably securing said first side frame member to one of said upper side wall edges, and second securing brackets for detachably securing said second side frame member to other of said upper side wall edge.

3. A combination according to claim 1 and further comprising a first latch member on said tool box and a second latch member connected to one of said front or said side walls of said compartment, said first and second latch members being positioned to detachably or retentively engage one another for detachably securing said tool box in said forward position.

4. A combination according to claim 3 wherein said tool box includes a front side facing said front wall of said carrying compartment, and a rear side facing said rear wall of said carrying compartment, a latch actuator mounted on said rear wall of said tool box and a latch connecting mechanism interconnecting said latch actuator to one of said first and second latch members for permitting the selective attachment and detachment of said first and second latch members to one another.

5. A combination according to claim 1 wherein said upper wall edges of said carrying compartment form an upwardly presented opening for said carrying compartment, said top cover detachably secured to at least some of said upper wall edges of said side walls in covering relation over said upwardly presented opening.

6. A combination according to claim 1 wherein said first access opening is located adjacent said rear wall of said carrying compartment.

7. A combination according to claim 6 wherein said first access door is detachable from said top cover to expose said carrying compartment through said first access opening.

8. A combination according to claim 6 and further comprising a second access opening in said top cover located adjacent said front wall of said carrying compartment to permit access to said tool box whenever said tool box is in said forward position, a second access door movably mounted to said top cover for movement from a closed position in covering relation over said second access opening to an open position exposing said tool box whenever said tool box is in said forward position.

9. A combination according to claim 8 and further comprising a third access opening in said top cover located adjacent said front wall of said carrying compartment to permit access to said tool box whenever said tool box is in said forward position, a third access door movably mounted to said top cover for movement from a closed position in covering relation over said third access opening to an open position exposing said tool box whenever said tool box is in said forward position.

10. In combination:

a vehicle having a carrying compartment therein, said carrying compartment comprising a floor having a front floor edge, a rear floor edge, and two opposite side floor edges, said carrying compartment further comprising a pair of opposite side walls, a front wall, and a rear wall, said side, front and rear walls extending upwardly from said opposite side floor edges, said front floor edge, and said rear floor edge, respectively, said pair of opposite side walls each having an upper side wall edge, said front and rear walls having an upper front wall edge and an upper rear wall edge, respectively;

a top cover comprising at least one access door and first and second spaced apart side frame members attached to said upper side wall edges of each of said pair of side walls;

said at least one access door being attached to, and extending between, said first and second side frame members, said access door being movable from a closed position in covering relation over said carrying compartment to an open position permitting access to said carrying compartment through a first access opening;

said first and second side frame members of said top cover having first and second elongated channels respectively, each extending along and above one of said upper side wall edges of said carrying compartment;

a tool box within said carrying compartment having first and second opposite ends;

first and second tool box support mechanisms operatively attaching said first and second ends of said tool box to said first and second elongated channels respectively, on said upper side wall edges of said carrying compartment, each of said support mechanisms comprising a roller, said roller being adapted to move along the length of said first and second elongated channels, whereby said tool box will be moved from a forward position to a rearward position within said carrying compartment.

11. In combination:

a truck bed having a floor, a front wall, a pair of opposite side walls, and a rear wall, all of said front, side, and rear walls having an upper edge, said upper edges of said front, side, and rear walls forming an upwardly presented opening;

an elongated tool box within a carrying compartment, said tool box having first and second opposite ends, a front tool box wall, and a rear tool box wall;

a top cover comprising at least two access doors and first and second spaced apart side frame members secured to said upper edges of said side, walls in covering relation over said upwardly presented opening said first and second side frame members of said top cover having first and second elongated channels respectively, each extending along and above said upper edges of said side walls of said carrying compartment;

mounting mechanism connecting said first and second opposite ends of said tool box to said elongated channels of said top cover;

a forward access opening in said top cover adjacent said front wall of said carrying compartment;

a rear access opening in said top cover adjacent said rear wall of said carrying compartment;

forward and rear access doors movably mounted to said top cover for movement between open positions permitting access to said carrying compartment through said forward and rear access openings, respectively, and closed positions in covering relation over said forward and rear access openings, respectively.

12. A combination according to claim 11 wherein said mounting mechanism permits movement of said tool box between a forward position approximately adjacent said front wall of said carrying compartment and a rearward position approximately adjacent said rear wall of said carrying compartment.

13. A combination according to claim 11 wherein said rear access door is removable from said top cover.

14. A combination according to claim 11 and further comprising a third access opening in said top cover adjacent said front wall of said carrying compartment, a third access door positioned in a closed position in covering relation over said third access opening and movable to an open position permitting access to said carrying compartment through said third access opening.

\* \* \* \* \*